United States Patent [19]

Bardet

[11] 4,067,710

[45] Jan. 10, 1978

[54] DEVICE FOR FEEDING AUTOMATIC CONTINUOUS PROCESS (KINEMATIC) MACHINES FOR THE MANUFACTURE OF GLASS OBJECTS

[75] Inventor: Gérard Bardet, Paris, France

[73] Assignee: Automatisme et Technique, Arcueil, France

[21] Appl. No.: 701,153

[22] Filed: July 30, 1976

[30] Foreign Application Priority Data

July 4, 1975   France ............................. 75.21129

[51] Int. Cl.² ........................................... C03B 5/30
[52] U.S. Cl. ........................................ 65/207; 65/328; 65/325
[58] Field of Search ............... 65/183, 207, 328, 324, 65/325, 330

[56] References Cited

U.S. PATENT DOCUMENTS

| | | | |
|---|---|---|---|
| 1,610,883 | 12/1926 | Ripley | 65/328 X |
| 1,618,290 | 2/1927 | La France | 65/328 |
| 1,651,036 | 11/1927 | Miller | 65/328 X |

Primary Examiner—S. Leon Bashore
Assistant Examiner—Frank W. Miga
Attorney, Agent, or Firm—Kinzer, Plyer, Dorn & McEachran

[57] ABSTRACT

The invention consists a device for feeding automatic continuous process (kinematic) machines for the manufacture of glass objects characterized in that it comprises a turning feeder integral with the drum of the machine.

7 Claims, 2 Drawing Figures

DEVICE FOR FEEDING AUTOMATIC CONTINUOUS PROCESS (KINEMATIC) MACHINES FOR THE MANUFACTURE OF GLASS OBJECTS

The invention relates to a device for feeding machines for the manufacture of glass objects and in particular automatic continuous process (kinematic) machines, intended for such manufacture.

Machines for the manufacture of glass objects are generally supplied with glass by means of fixed feed spouts of which the upper extremity is connected to a reservoir containing molten glass and of which the lower extremity opens above the machine. At the oulet of these fixed feed spouts, are "feeder shears" which cut off the glass drop so that it falls into the reception spouts connected to the machine.

This known arrangement has several disadvantages and in particular in the case of automatic continuous process machines, the reception spouts connected to one of the drums of the machine are driven rotatively with this drum and the drops of glass cut off by the "feeder shears" must fall in flight into the reception spouts. On the other hand, to obtain high production rates with automatic continuous process machines, it is necessary to feed sometimes large numbers of stations on the drum of the machine. At the outlet of the fixed feed spouts, this simultaneous supplying of a large number of stations is difficult to achieve, which limits the production rate of the machine.

The object of the invention is to overcome these disadvantages and to provide a device which will enable a large number of stations on the drum of a continuous process machine to be fed simultaneously.

To this end, the invention relates to a device for feeding machines for the manufacture of glass objects, in particular automatic continuous process machines for manufacture of glass objects, which device is characterized in that basically it comprises a feeder rotating integrally with the drum of the machine above the axis of the latter, this turning feeder receiving on its upper part and following its axis, the molten glass coming from the fixed feeder and distributing the glass through orifices made in this lower part and which can engage, by action of a fixed cam, pistons, whose axes are parallel to the axis, the holes being distributed uniformly on the periphery of the turning feeder perpendicularly to the various stations of the drum of the machine and their reception spouts, the feeder shears, controlled by a fixed cam, being associated respectively with each of the orifices, cut off the glass when the latter has been pushed downward by the action of the piston.

The invention will be described in greater detail by means of an example of its embodiment shown in the accompanying drawings in which.

The molten glass is brought to above the machine by a fixed feeder 2 connected to a reservoir containing molten glass. The molten glass passes from the fixed feeder 2 into the reception spouts 3 connected to the drum of the automatic continuous process machine by means of a feeder device according to the invention designated by 4.

Figure 2:
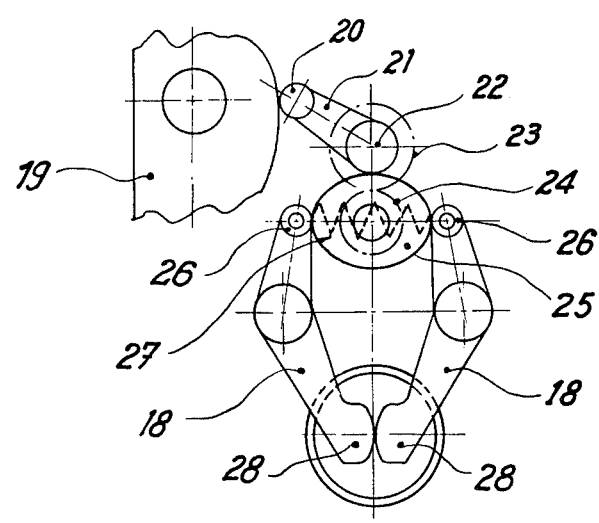
FIG. 2 is a detail showing the "feeder shears", represented in FIG. 1.

This device consists essentially of a "turning feeder" 5, 5' borne by a support 6, integral with the drum of the automatic continuous process machine, and which rotatively drives the feeder 5, 5' about the axis 7 of the drum of the continuous process machine. The turning feeder 5, 5' consists with advantage of two superimposed parts, an upper part 5 and a lower part 5', assembled by means of a plane horizontal joint. This arrangement enables the turning feeder to be dismantled and cleaned easily. Each of the parts 5 and 5' comprises an integrated heating circuit and heat installation so as to be able to maintain the mass of glass in the turning feeder in the molten state. These heating and heat insulating means are of the conventional type and are known and will therefore not be shown in the drawings. A fixed feeder extends into the interior of the turning feeder 5, 5' by means of a projection 2', and a toric sealing joint 8 is placed between the fixed projection 2' and the upper extremity of the turning feeder 5, 5'. The lower extremity of the upper part 5 of the turning feeder 5, 5', widens out in the shape of a collar and, carries, at intervals identical with those which separate the various stations of the drum of the continuous process machine, sleeves 9 whose axes are parallel to the axis 7 of the drum of the continuous process machine and inside which slide the pistons 10 which push the glass. These pistons 10 carry at their upper extremity a cap 11 in which is mounted a control roller 12 which turns on a fixed cam 13. The fixed cam 13 is integral with the frame of the continuous process machine by means of angle pieces 14, of the support plate 15 which also carries the fixed feeder, and of the columns 16. Springs 17 acting on the lower face of the caps 11 apply the rollers 12 permanently against the fixed cam 13. Perpendicularly to each of the rings 9, are mounted on the lower face of the lower part 5' of the turning feeder 5, 5' feeder shears 18 controlled by a fixed cam 19, (see FIG. 2). On the fixed cam 19 turns a roller 20 carried at the extremity of a lever 21 whose rotational axis 22 is integral with the part 5' of the turning feeder 5, 5'. By means of a gear train 23, 24, the handle 21 rotatively drives an ellipsoidal cam 25 which, by means of the rollers 26, controls the feeder shears 18. A pulling spring 27 maintains the rollers 26 permanently applied against the cam 25. Under these conditions, when the cam 25 is in the angular position shown in FIG. 2, the position in which the large axis of the ellipse passes through the axes of the rollers 26, the cutting edges 28 of the feeder shears 18 are in contact with one another, whereas when the cam 25 is in an angular position offset by 90% from its preceding position and in which the small axis passes through the axes of the rollers 26, the cutting edges 28 of the feeder shears are then in their maxium separation position.

The assembly which has just been described operates in the following manner. The molten glass 1 contained in the fixed feeder 2, passes by means of the projection 2' of this feeder, into the turning feeder 5, 5'. The viscosity of the glass prevents it rising in the narrow annular space separating the fixed projection 2' from the upper part 5 of the turning feeder 5, 5'. This viscosity also prevents the glass flowing, when the piston 10 is in its high position as shown on the right hand side of FIG. 1, by means of th orifices 29 made in the lower part 5' of the turning feeder 5, 5' at right angles to each of the pistons 10. During the rotation of the turning feeder 5, 5', driven by the drum of the continuous process machine, the cam 13, by means of the roller 12 of the cap 11, drives downward the piston 10 on which the lower extremity penetrates into the orifice 29, as shown on the left-hand side of FIG. 1, by driving downward a drop of glass which has just protruded to below the turning feeder 5, 5'.

Figure 1:
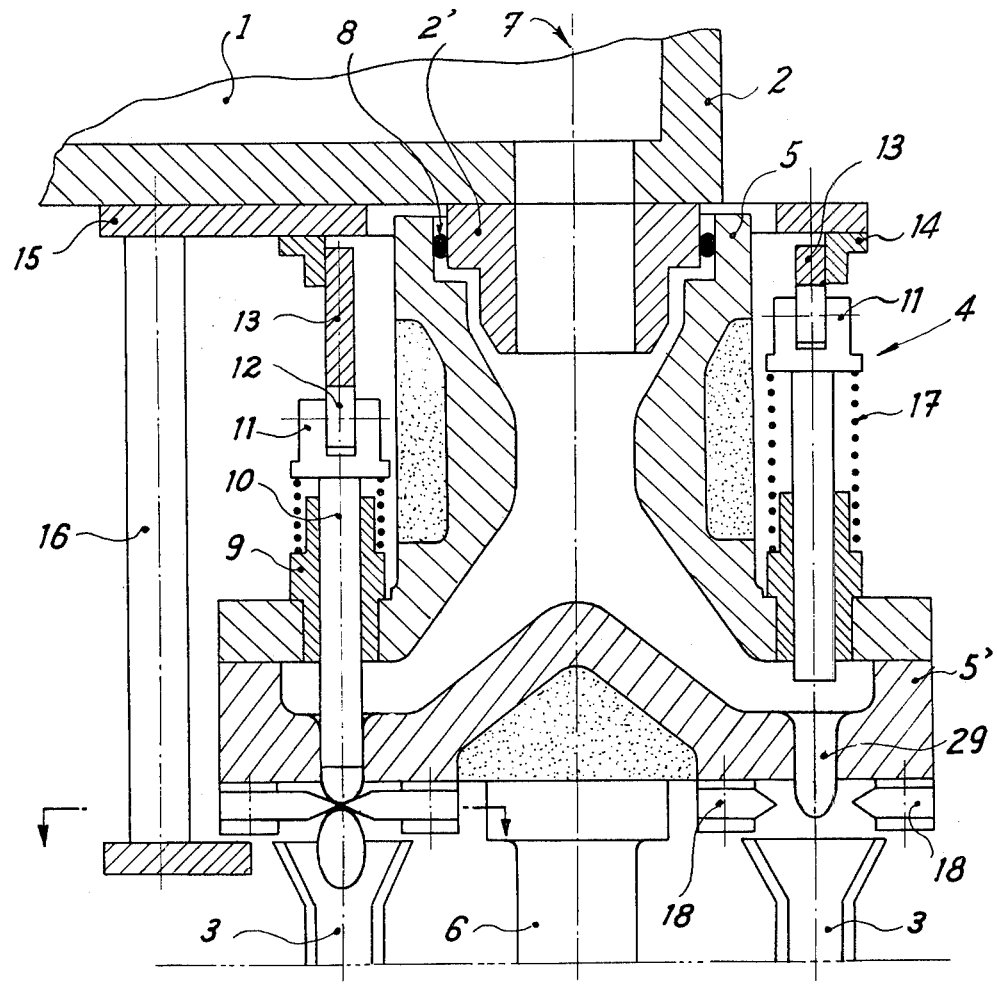
FIG. 1 is an axial sectional view of the feeder device according to the invention.

In the situation shown on the right-hand part of FIG. 1, the piston 10 is in its high position, and the feeder shears 18 are in their maximum open position. This means that the ellipsoidal cam 25 is in an angular position offset by 90° from that represented in FIG. 2, the small axis of the cam 25 then passing through the axes of the rollers 26. This situation is maintained during a part of the rotary and movement of the turning feeder 5, 5' and then, shortly before the station concerned of the turning feeder 5, 5', is in the situation represented on the left-hand side of the FIG. 1, a boss on the fixed cam 19 controls, by means of a lever 21 the rapid rotation of the cam 25 by a quarter of a turn. The effect of this is to place this cam 25 in the position represented by FIG. 2 and thus to close the feeder shears whose cutting edges 28 come into contact, thus cutting off the glass drop which protuded below the turning feeder 5, 5'. The glass drop thus liberated falls into the receiving spout 3 which follows the feeder 5, 5' in its rotary movement. As the rotation continues, the piston 10 returns to its high position, the feeder shears 18 open up again to their maximum, and the cycle which has just been described can start again.

It is clear that the device whose operation has just been described, can feed simultaneously any number of receiving spouts 3 and, as the distribution orifices 29, as well as the feeder shears 18 associated with them, follow the receiving spouts 3 in their rotary motion, the transfer of the drop of glass into the receiving spout 3 does not involve any hazards as in the case in the known machine where the drop falls from the fixed feed spout to the moving receiving spout 3.

Of course, the invention is not limited to the example of its embodiment herein above described and illustrated and on the basis of which other modes of embodiment can be envisaged without departing from the scope of the invention.

I claim:

1. A device for feeding machines for the manufacture of glass objects and comprising a single rotary feeder supported for rotation about a predetermined axis, said feeder having a single recess for receiving molten glass, a fixed feeder juxtaposed above said recess for distributing glass thereto, said rotary feeder supporting a plurality of glass pushing pistons whose axes are parallel to said predetermined axis, said rotary feeder recess being provided with a plurality of piston receiving openings coaxial with the pistons and arranged in spaced relation about the periphery of the recess each to accept a volume of glass to be pushed therefrom by a related piston, a fixed cam and cooperating means on the pistons for reciprocating the pistons during rotation of the rotary feeder, and a plurality of receiving spouts positioned beneath said piston receiving openings for receiving molten glass delivered by the reciprocating pistons, the cam imparting an advance stroke to each piston which causes the piston to penetrate into a piston receiving opening to force a volume of glass through and out of the piston receiving opening into the receiving spout therebeneath, and the cam imparting a reverse stroke displacing each piston above the related piston receiving opening to allow molten glass to flow from the recess into a piston receiving opening.

2. A device according to claim 1 in which the fixed feeder comprises a projection directed downward along the axis of the recess to penetrate the recess and from which it is separated by a narrow annular space in which there is a toric seal.

3. A device according to claim 1 in which the pistons are supported in sleeves carried by the rotary feeder and in which said cooperating means include a cam follower and a return spring on each piston.

4. A device according to claim 2 in which the pistons are supported in sleeves carried by the rotary feeder and in which said cooperating means include a cam follower and a return spring on each piston.

5. A device according to claim 2 in which there is a shearing means interposed between each receiving spout and discharge opening for liberating a glob of glass.

6. A device according to claim 3 in which there is a shearing means interposed between each receiving spout and discharge opening for liberating a glob of glass.

7. A device according to claim 4 in which there is a shearing means interposed between each receiving spout and discharge opening for liberating a glob of glass.

* * * * *